(12) United States Patent
Dzierzon et al.

(10) Patent No.: US 7,421,481 B2
(45) Date of Patent: Sep. 2, 2008

(54) METHOD, SYSTEM, AND COMPUTER PROGRAM PRODUCT FOR CACHING WEB CONTENT

(75) Inventors: Rainer Dzierzon, Renningen (DE);
Carsten Leue, Sindelfingen (DE);
Stefan Liesche, Boeblingen (DE);
Thomas Schaeck, Achern (DE)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 11/242,258

(22) Filed: Oct. 3, 2005

(65) Prior Publication Data

US 2006/0095676 A1 May 4, 2006

(30) Foreign Application Priority Data

Oct. 12, 2004 (EP) .................................. 04104995

(51) Int. Cl.
*G06F 15/16* (2006.01)
(52) U.S. Cl. ........................ 709/217; 709/206; 709/213; 711/133; 711/118
(58) Field of Classification Search ........................ None
See application file for complete search history.

(56) References Cited

U.S. PATENT DOCUMENTS

2003/0187935 A1* 10/2003 Agarwalla et al. .......... 709/206

\* cited by examiner

*Primary Examiner*—Donald Sparks
*Assistant Examiner*—Alan M Otto
(74) *Attorney, Agent, or Firm*—Stephen T. Keohane; Hoffman Warnick LLC

(57) ABSTRACT

The invention provides a method, system and computer program product for caching dynamic portal pages without changing the existing caching proxy infrastructure or the transportation protocol used by providing an advanced caching component. An advanced caching component provides the functionality that additional dynamic page specific cache information is provided as part of the response including the portal page. Each component in the portal that dynamically contributes page fragments to be aggregated to a portal page provides dynamic component specific cache information which includes component specific cache scope and expiration values. The component specific cache scope and cache expiration values are used to calculate dynamic page specific cache information resulting in a common minimum cache scope and a common minimum cache expiration values for a portal page to be aggregated. The dynamic page specific cache information ensures that the minimum cache scope is correctly chosen as contributed from the components and the minimum cache expiration does not exceed any of the component specific cache expiration values.

7 Claims, 6 Drawing Sheets

FIG. 1

| Portal resource | Remote cache scope | Remote cache expiration | Ignore access control in caches |
|---|---|---|---|
| Portal | | Yes | |
| Page Object | Yes | Yes | Yes |
| Layout Application | Yes | Yes | |
| Portlet Definition | Yes | Yes | |
| Portlet Window | Yes | Yes | |

FIG. 4

METHOD, SYSTEM, AND COMPUTER PROGRAM PRODUCT FOR CACHING WEB CONTENT

BACKGROUND OF THE INVENTION

1. Field of the Invention

The present invention relates to a method, system, and computer program product for caching web content, in particular to generate caching information for dynamic portal pages and the caching thereof in an existing caching proxy infrastructure.

2. Related Art

Caching of web content has been used for a long time. The basic standards that allow caching of web pages are defined in the underlying HTTP protocol. These protocols mainly address caching needs for static pages. If dynamic pages are assumed at all, they are always considered as inseparably complete pages individually requested by one URL.

Portal server applications (hereinafter called portals) have introduced a new dimension of flexibility of web page content. Portal pages (see, e.g., FIG. 1) include multiple parts that have different states and different caching requirements for their respective content. Portlets are applications that are running within the portal. The UI of these applications includes sub-sections of the portal pages rendered by the portal. These portlets generate their markup fragments dynamically on request based on their internal state. The look and feel of the portal is generated by layout applications (e.g., Theme/Skin). Layout applications are dynamic applications that may control the look and feel depending on their state. Up to today completely rendered portal pages are not cached. Only a very small subset of generated pages which are known to not change their content over time can be cached.

Portal pages are highly dynamic. Their page content is generated by a hierarchy of multiple dynamic application components and states, such as the combination of portlets on the page which may change over time, the state of portlets on the page, the content of these portlets that may change over time, and most likely navigation elements that depend on current configuration and current state.

Portlets are stateful applications that render their markup on each request. Not only is the markup itself dynamic, but also the lifetime of the rendered markup is calculated dynamically at execution time of the portlet. The expected lifetime for a markup fragment can depend on the current state of the portlet. This highly dynamic characteristic of portal pages makes them non-cacheable.

As mitigation, some portal products today support caching of individual page fragments depending on the expiry time of each individual fragment. On incoming requests, these fragments are aggregated to build the complete portal page. This task is carried out by the portal itself, so each request to a portal page needs to travel the whole way through the network to the origin server.

There is no technique available today that allows caching of highly dynamic portal pages utilizing caching mechanisms.

SUMMARY OF THE INVENTION

The present invention provides a method, system and computer program product that allows caching of dynamic portal pages without changing the existing caching proxy infrastructure or the transportation protocol to be used by providing an advanced caching component.

The advanced caching component provides the functionality that additional dynamic page specific cache information is provided as part of the response including the portal page.

Each component in the portal that dynamically contributes page fragments to be aggregated to a portal page provides additionally dynamic component specific cache information, which includes a component specific cache scope value and a component specific cache expiration value. All of these single component specific cache scope and cache expiration values are used to calculate dynamic page specific cache information resulting in a common minimum cache scope and a common minimum cache expiration value for a portal page to be aggregated. The dynamic page specific cache information ensures that the minimum cache scope is correctly chosen as contributed from the components and the minimum cache expiration exceeds any of the component specific cache expiration values. The dynamic page specific cache information is provided as a part of the header of the response including the portal page. The cache then evaluates the dynamic page specific cache information without being changed.

BRIEF DESCRIPTION OF THE DRAWINGS

The above, as well as additional objectives, features and advantages of the present invention will be apparent in the following detailed written description. The novel features of the invention are set forth in the appended claims. The invention itself, however, as well as a preferred mode of use, further objectives, and advantages thereof, will be best understood by reference to the following detailed description of an illustrative embodiment when read in conjunction with the accompanying drawings, wherein:

FIG. 1 shows a typical Portal page;

FIG. 4 shows an overview of required data to calculate the overall caching information.

DETAILED DESCRIPTION OF THE INVENTION

Figure 2:
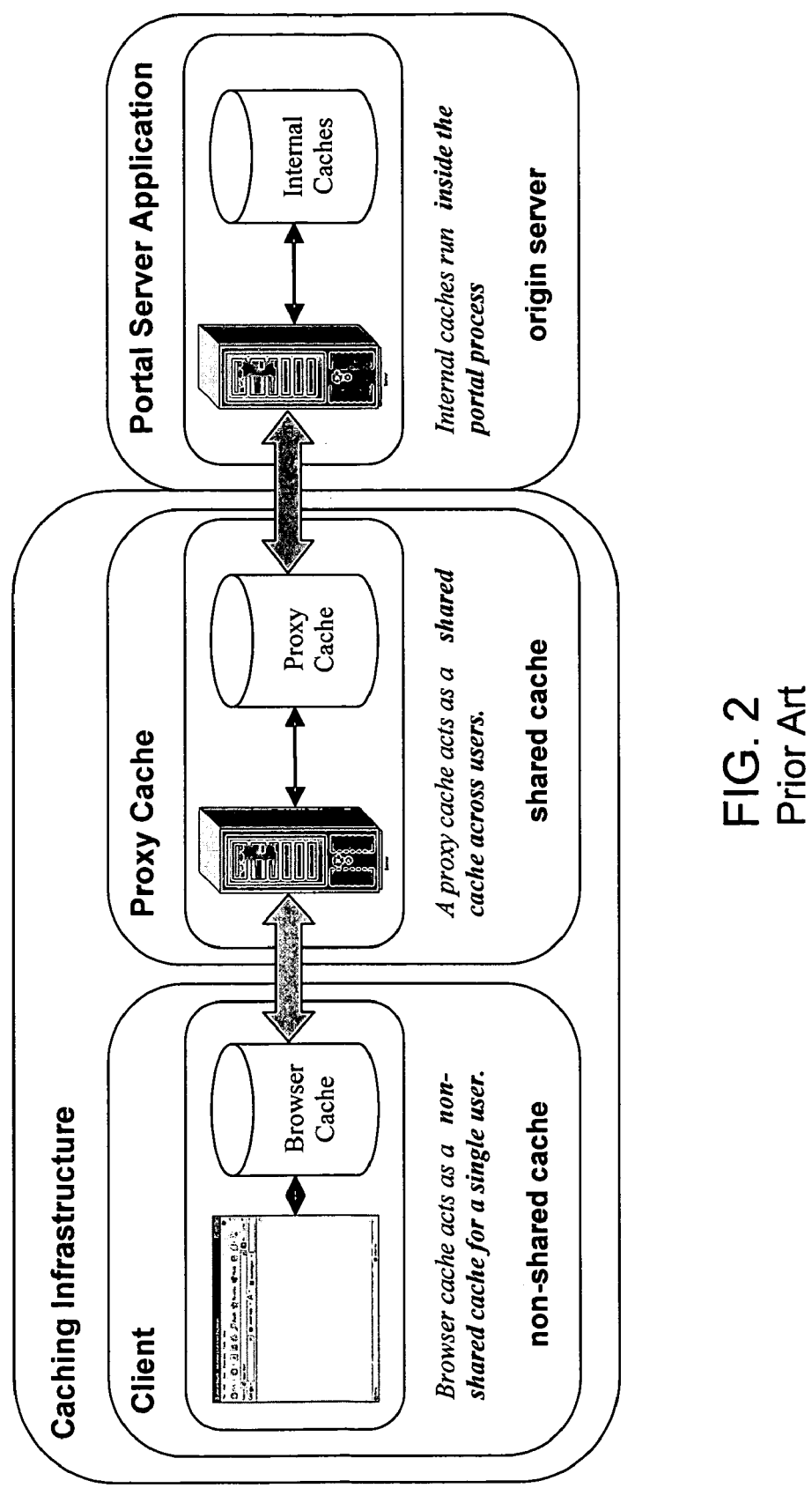
FIG. 2 shows a prior art proxy caching infrastructure to be used by the present invention without changing it.

The HTTP 1.1 specification (RFC2616) uses the terms "shared cache" and "non-shared cache" when talking about caching. Both types of caches are called caches in the patent application. They are located outside the request origin process and in the most cases are completely outside the origin server machine. The origin sever can make use of the HTTP protocol, using header variables, to communicate the expected lifetime of the currently delivered information, e.g., web page, portal page or image, to other components that participate in this communication flow. The meta-data provided as HTTP response headers is evaluated by the cache to allow the origin server to take control over the time interval in which the cache will assume the received content is still valid.

The HTTP specification provides details on the use of the protocol to allow the origin server to communicate the validity of delivered content to caches. The cache evaluates this information and adopts its behaviour on the processing of subsequent requests to the same resource accordingly. The HTTP protocol provides no means for origin servers to actively invalidate specific entries through a HTTP—request or response. The only invalidation mechanisms are expiry timeout and maybe administrative actions.

HTTP-Headers

The relevant HTTP 1.1 headers that are particular interesting for content caching of page requests are:
For the cache scope:
cache-control: public;
cache-control: private; and
cache-control: no-cache.
For the cache expiration:
cache-control: max-age delta-seconds.
For the client scope (vary header):
user-agent;
accept-language; and
other-configurable-header-fields These HTTP-headers are listed here for the reader to allow easier lookup of more information on these properties in the HTTP 1.1 specification.

The cache-control: public indicates that the response may be cached by any cache, even if it would normally be non-cacheable or cacheable only within a non-shared cache.

The cache-control: private indicates that all or part of the response message is intended for a single user and must not be cached by a shared cache. This allows an origin server to state that the specified parts of the response are intended for only one user and are not a valid response for requests by other users. A private (non-shared) cache may cache the response.

If the no-cache directive does not specify a field-name, then a cache MUST NOT use the response to satisfy a subsequent request without successful revalidation with the origin server. This allows an origin server to prevent caching even by caches that have been configured to return stale responses to client requests.

When the max-age cache-control directive is present in a cached response, the response is stale if its current age is greater than the age value given (in seconds) at the time of a new request for that resource. The max-age directive on a response implies that the response is cacheable (i.e., "public") unless some other, more restrictive cache directive is also present.

A server should use the vary-header-field to inform a cache of what request-header-fields were used to select among multiple representations of a cacheable response subject to server-driven negotiation. The set of header fields named by the vary-field-value is known as the "selecting" request-headers.

The vary-field-value indicates the set of request-header fields that fully determines, while the response is fresh, whether a cache is permitted to use the response to reply to a subsequent request without revalidation.

This is the set of functionality that is provided by the HTTP-protocol for use by HTTP-talking components. This limited set of functionality rendered today's portal servers to deliver their responses mainly as non cacheable.

A prior art "proxy caching infrastructure" is illustrated in FIG. 2. The present invention uses, but does not change, the prior art proxy caching infrastructure.

Figure 3A:
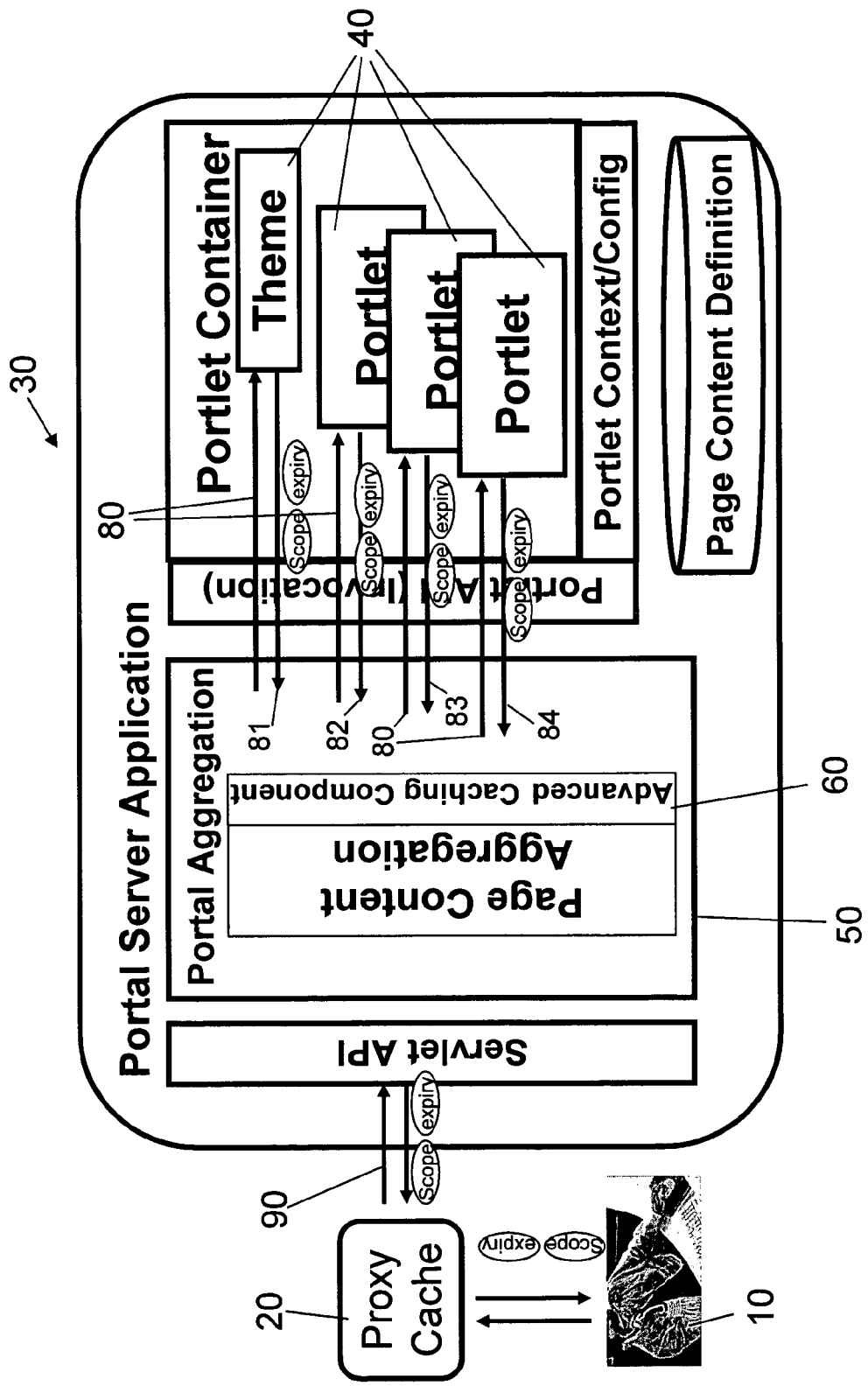
FIG. 3A shows the basic implementation of the inventive advanced caching component in an existing portal.

FIG. 3A shows the basic implementation of the advanced caching component of the present invention in a portal.

The inventive advanced caching component 60 of the present invention can be used in a prior art portal server application 30. The advanced caching component 60 is preferably embedded in the portal aggregation component 50.

The portal aggregation component 50 receives a user request for a portal page and generates requests 80 to the individual components 40, e.g., portlets, themes, etc., which then dynamically provide portal page fragments including their component specific dynamic cache information 81-84.

The component specific dynamic cache information 81-84 includes a component specific dynamic cache scope value and a component specific dynamic cache expiration value (time). Each component itself is responsible for generating component specific dynamic cache information 81-84. In a specific implementation the component specific dynamic cache information 81-84 is retrieved from the same application as the content itself. For example, if the backend system is a content management application, the component specific dynamic cache information would be retrieved from the content meta-information. In another specific implementation the component itself implements the logic. The component specific dynamic cache information 81-84 would be defined along the logic within the individual component.

The advanced caching component 60 extracts the component specific dynamic cache information 81-84 from the component responses and calculates the dynamic page specific cache information 90 for the portal page to be aggregated. The dynamic page specific cache information 90 includes a common minimum cache scope value and a common minimum cache expiration value for the resulting portal page. The calculation algorithm is described below. The complete portal page including the dynamic page specific cache information 90 is provided as part of the response from the portal server 30 to a cache. The cache 20 can evaluate the cache information 90 contained in the response for caching the page for follow-on requests. Subsequent requests to cached pages can be responded by the cache 20 without involving the portal server application 30. If the cache information 90 embedded in the portal page does not allow caching, the request is directed from the cache 20 to the portal server application 30.

A potential interface for portlets which provides portal fragments with component specific dynamic cache information 81-84 can be implemented as follows:

The component specific dynamic cache information 81-84 generated by the portlets 40 is provided at runtime. The portal API (Application Programming Interface) defines an EXPIRATION_CACHE setting to be specified at runtime. The advanced caching component 60 utilizes this setting of the component specific dynamic cache expiry. The same mechanism can be used for utilizing the dynamic cache scope information.

Figure 3B:
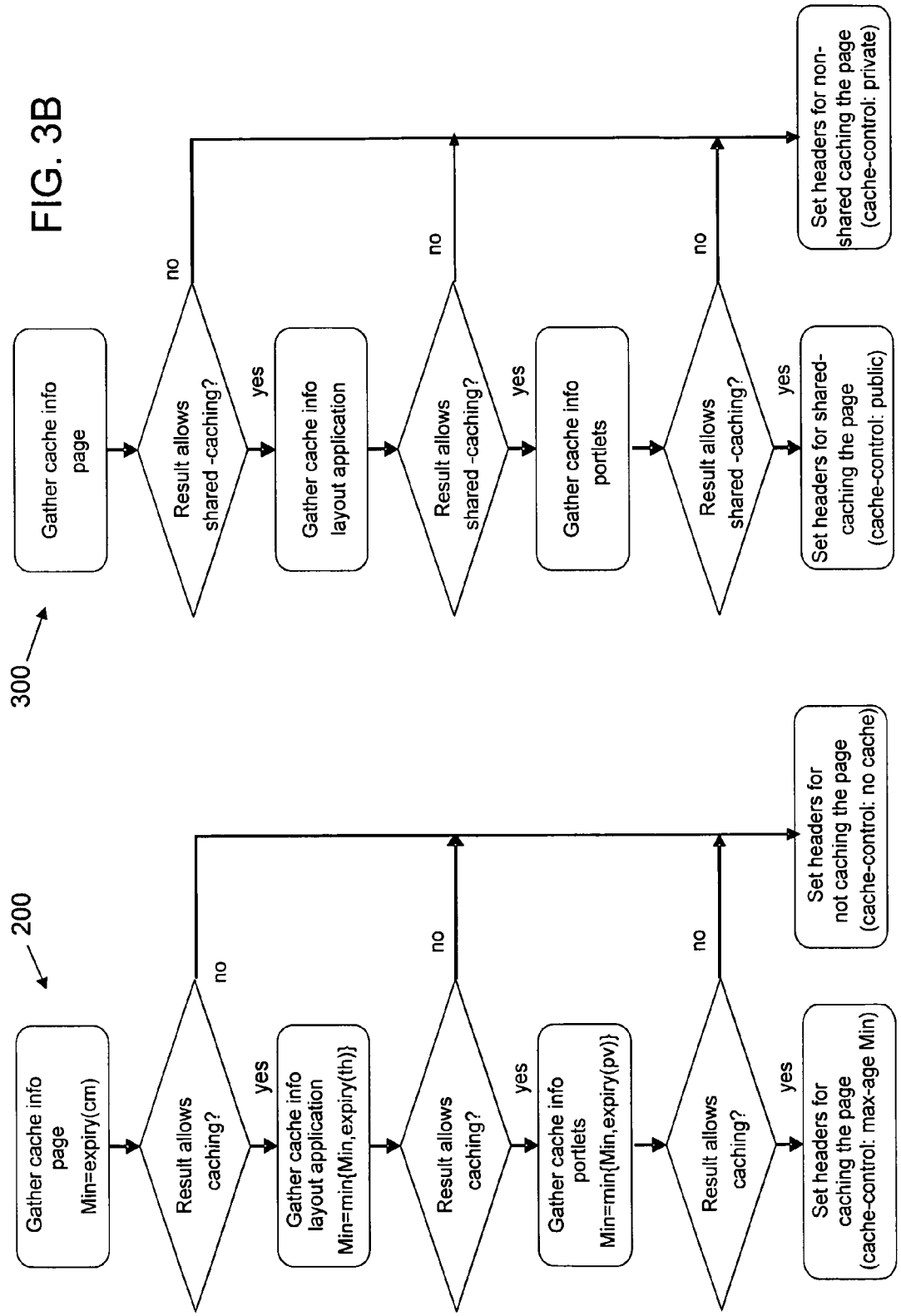
FIG. 3B shows the inventive caching mechanism for calculating cache scope and cache expiration for a portal page.

Described is an example how a portlet programmer could publish the cache information, e.g., remote cache, at runtime:
RemoteCacheInfo.MetaData.SCOPE="Portlet.remote-cache-scope";
RenderResponse.setProperty("EXPIRATION_CACHE", (new Integer(3000)).toString( ));
RenderResponse.setProperty("CACXHE-SCOPE", "PRIVATE");

FIG. 3B shows the inventive caching mechanism for calculating common cache scope and common cache expiration for a portal page.

The above described process flow ensures minimal execution time. As soon as it comes clear that any given component prevents caching of the full page, the calculation is completed.

The advanced caching component 60 gathers component specific dynamic caching information of all addressed components which provide portal page fragments (see also FIG. 3A). The calculation of the common cache information for the complete portal page is calculated based on these single values. Typically the calculation of the common cache scope of the portal page and the calculation of the common cache expiry for the portal page are performed independently 200, 300. In a preferred implementation, the calculation of the common cache expiry time is done before the calculation of the cache scope.

For calculating the common minimum cache expiration values for a certain portal page, the advanced cache component determines a minimum expiry time among the expiry times provided by each portal fragment, and compares each component specific dynamic cache expiry time with the current minimum of component specific dynamic cache expiry times. If the new component specific dynamic cache expiry time is smaller than the currently identified minimum value, the new component specific dynamic cache expiry time is taken as the new minimum value. The minimum and thus the common page cache expiry value is found when all component specific dynamic cache expiry times are compared or if one component requires the smallest possible expiry time called expire immediately (expiration time=0). The advanced caching component 60 can stop calculation of the minimum common expiry time among the component expiry times as soon as a component is found that requires immediate expiry (expiration time=0), in this case calculation is stopped and defines the common expiry time as immediate expiry (expiration period=0). If the calculated common cache expiry time requires immediate expiry, the common cache scope calculation is not required and can be set to private.

For calculating a common minimum cache scope value of the portal page, the advanced caching component 60 derives the smallest component specific dynamic cache scope among the component specific dynamic caches scopes provided by each portal fragment. The advanced caching component 60 can stop calculation of the common cache scope as soon as a component is found that allows caching only in private scope (non-cacheable). In that case calculation is stopped and the advanced caching component 60 defines the common cache scope as private or non-cacheable.

Figure 3C:
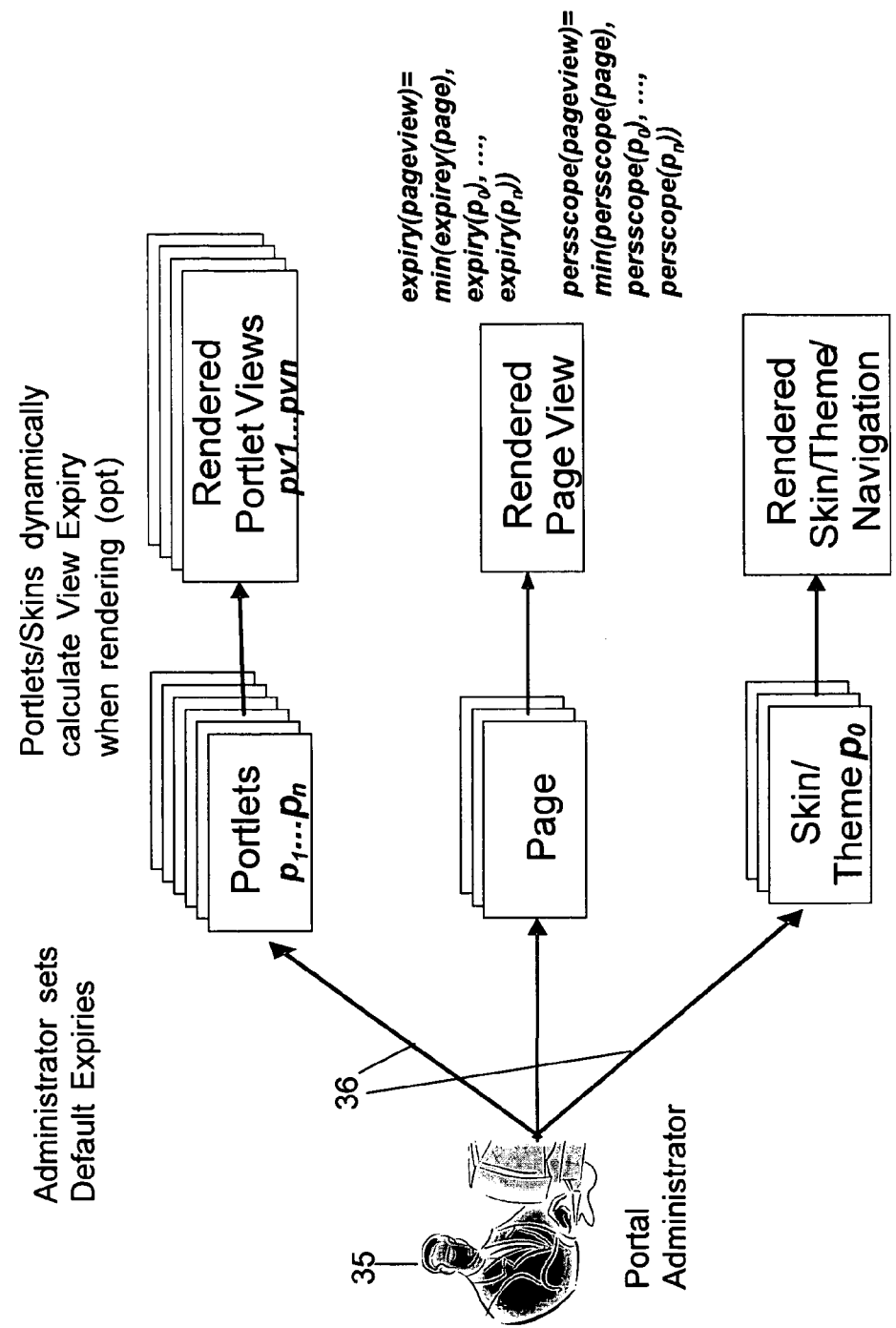
FIG. 3C shows the static configuration of caching information according to the present invention.

FIG. 3C shows a static configuration of caching information. If a component does not provide a component specific dynamic cache information, the portal server falls back to a default component specific cache information configured for the given component. The administrator 35 of the portal server can define default cache information 36 for each component.

FIG. 4 shows an overview of the required data to calculate the overall caching information. The contents will be explained hereinafter.

Contributors of component specific dynamic cache information are the portal, the page object (page) currently requested, the layout application associated with that page object, the portlet definitions for all portlets on the currently requested page object, and the portlet windows for the currently requested page object.

All of these components except for the portal provide information about component specific cache expiration values (in seconds) and component specific cache scopes (valid values are "shared" and "non-shared").

The portlet windows also provide render state information for caches. With this approach for a portlet it is possible to publish this information dynamically. This design allows that even several view states of a single portlet are cacheable. Through the use of render parameters, which are defined in the JSR168 Portlet API specification, it is possible to address portlet view states with URLs having encoded the state for each portlet. Since the URL is the only key for a cache it is an important feature that is a prerequisite for the overall design of the present patent application to be applied efficiently. Portlets get the possibility to indicate their current view as cacheable which can be used by the portal server to calculate the full page expiry time for a cache. With this design it can be assumed that the overall number of pages that are potentially cacheable is large enough to exploit a caching infrastructure. For example a new portlet may show several views, i.e., like newspaper pages of an article. These portlet views do not change for a reasonable amount of time but they are different and can directly be addressed through a URL which encodes the view state of the portlet.

It certainly depends on the features of a cache and whether it implements the interpretation of cache control headers as described in the HTTP 1.1 specification. However, there is no disadvantage if these cache control headers are published by the portal if there is no cache in the infrastructure. There would be simply no component in the infrastructure which could exploit the cache control header.

Application Responsibilities

The present invention requires that all components, which are contributes page fragments to page content, additionally provide information of expiration values of the provided content. Components can communicate the expiration values of their generated parts of the content either via configuration parameters that are handled by the portal, or the component itself or by dynamically providing expiration values at runtime.

For example, the portlet itself can decide at render time whether its output is cacheable or not and if yes how long. A preferred embodiment of this invention would also assume that if a portlet does not publish any cache information at render time a fall back to the information provided by the portlet definition is possible. In that case the values provided by the portlet definition will be considered only.

Portal Responsibilities

The portal is responsible for delivering the full portal page. It is the responsibility of the portal to provide the expiration time of the portal page to caches. This information is provided as cache directives as defined in the HTTP protocol specification. This allows applying the present invention without requiring any change to existing caches. Changes are only required within the portal and its components.

To achieve these goals the portal server needs to provide additional caching information along with the generated HTTP response. The cache information that needs to be provided with each generated page is at least the cache scope: can this page be cached? And cache expiration time: How long is this entry valid in the cache?

This information is provided in form of header fields which are part of the HTTP responses of the portal server.

Caches typically accept the URL of an incoming request as the key for entities stored in the cache. This may become a problem since the generation of mark-up in portals does not depend on the URL alone. Portals also might take into consideration the "user-agent" and "accept-language" header fields from a request while generating mark-up. The solution to this potential problem is to make use of the "vary" header fields to indicate which other header fields of an incoming request need to be of the same value as stored in the cache so that a validation and a roundtrip to server is not required.

The portal gathers this information from the different components that participate in generating the resulting page. Each component that contributes portal page fragments to the portal page will contribute a component specific cache expiration value as well. Components can communicate their component specific cache expiration value either via configuration parameters that are handled by the portal or the component itself or by dynamically providing component specific cache expiration value at runtime. If no component specific cache expiration value or component specific cache scope value is provided by the components neither dynamically, nor by configuration, a default value is assumed.

All of the component specific dynamic cache information contributed by the components needs to be merged and therefore a common minimum cache scope and a common minimum cache expiration value have to be calculated. It should be noted that only one set of values for a portal page can be specified with respect to the HTTP specification.

The present invention ensures that the:

1. common minimum cache expiration does not exceed any of the values contributed from the components and 2. common minimum cache scope is correctly chosen as contributed from the components. Mathematically it is defined as follows:

The common minimum cache scope is defined as follow:
All Portlet definitions $pd_i$,
all Portlet windows $pv_i$ (views),
the Layout Application th on a page and
the Page Objects cm itself
have associated a personalization cache scope:
cache-scope($pd_i$),
cache-scope($pv_i$),
cache-scope(th),
cache-scope(cm)
which can adopt the values of {non-shared, shared} with a relation of '<' defined as non-shared<shared.

The common minimum cache expiration time is defined as follows:
All Portlet definitions $pd_i$,
Portlet windows $pv_i$ (views),
the Layout Application th on a page and
the Page Object cm itself
have associated component specific expiration values–times
cache-expiration($pd_i$),
cache-expiration($pv_i$),
cache-expiration(th),
cache-expiration(cm)
which can take values of >=0 (sec), respectively.

The common minimum cache expiration time of a rendered portal page view will be calculated as the minimum of all values:

```
cache-expiration(page) =
min(
    cache-expiration(pd₁), ... cache-expiration(pdₙ),
    cache-expiration(pv₁), ... cache-expiration(pvₙ),
    cache-expiration(th),
    cache-expiration(cm)
)
```

The common minimum cache scope of a rendered portal page view will be calculated as the minimum of all values:

```
remote-cache-scope(page) =
min(
    cache-scope(pd₁), ... cache-scope(pdₙ),
    cache-scope(pv₁), ... cache-scope(pvₙ),
    cache-scope(th),
    cache-scope(cm)
)
```

When the common minimum cache scope and a common minimum cache expiration value are calculated according to the given formulate, this values can be used for setting the according values for the full resulting portal page.

Using this invention it is possible to design portals for efficient utilization of caches without changing the underlying transport protocol or the existing caching infrastructure. Components that contribute portal fragments to the portal markup can additionally control cache scope and expiration time of their portal fragments. Cache expiry time and scope of component content can be calculated and communicated each time new content is rendered. This information is used to calculate the scope and expiry time of the portal markup.

With this new invention it will be possible to differentiate between cacheable and non-cacheable portal pages on a very fine granular level. It adds value to portal where there are many hits on pages which are static in its nature and when there is a need to handle high loads, especially if there is some chance that the content does not need to be rendered again by the portal.

The invention claimed is:

1. Method for dynamically generating caching information for dynamic portal pages in a portal, wherein each portal includes a portal aggregation component which receives user requests, provides user requests to at least one component, receives responses including portal page fragments from each component, and aggregates said portal fragments to build a complete portal page, comprising: dynamically generating, in conjunction with each portal page fragment, component specific cache information, wherein said component specific dynamic cache information includes at least a component specific cache scope value and a component specific cache expiration value, extracting said component specific dynamic cache information from the portal page fragments, calculating dynamic page specific cache information, wherein said dynamic page specific cache information includes a common minimum cache scope and a common minimum cache expiration value, and inserting said dynamic page specific cache information into said portal page being aggregated into a complete portal page; wherein the common minimum cache scope is calculated after calculating the common minimum expiry time, except if a result of the common minimum expiry time indicates immediate expiry for the portal page, then the common minimum cache scope is not calculated.

2. Method according to claim 1, wherein said component specific cache information is generated at run-time.

3. Method according to claim 1, further comprising:
using a component specific default cache value if no component specific cache information is provided with a portal page fragment.

4. Method according to claim 1, wherein said dynamic page specific cache information is inserted in a header of a response which includes said complete portal page.

5. Method according to claim 1, wherein said common minimum cache scope is calculated by determining whether the portal page is private, public, or no-cache.

6. Method according to claim 1, wherein said common minimum expiration value is calculated by determining a lowest component specific dynamic expiry value.

7. Method according to claim 1, wherein said portal page is provided to a cache using the HTTP-protocol.

* * * * *